United States Patent [19]
Spies et al.

[11] Patent Number: 5,163,319
[45] Date of Patent: Nov. 17, 1992

[54] METHOD AND A DEVICE FOR RECOGNIZING THE CONDITION OF A ROAD

[75] Inventors: Hans Spies, Pfaffenhofen; Walter Weishaupt, Munich, both of Fed. Rep. of Germany

[73] Assignees: Messerschmitt-Bolkow-Blohm GmbH; Bayerische Motoren Werke AG, both of Fed. Rep. of Germany

[21] Appl. No.: 466,336

[22] PCT Filed: Oct. 12, 1988

[86] PCT No.: PCT/EP88/00950
    § 371 Date: Jun. 5, 1990
    § 102(e) Date: Jun. 5, 1990

[87] PCT Pub. No.: WO89/04498
    PCT Pub. Date: May 18, 1989

[30] Foreign Application Priority Data

Nov. 11, 1987 [DE] Fed. Rep. of Germany ....... 3738221

[51] Int. Cl.⁵ .............................................. G01B 11/30
[52] U.S. Cl. ..................... 73/146; 356/371; 356/376
[58] Field of Search .................. 73/146, 105; 356/371, 356/376

[56] References Cited

U.S. PATENT DOCUMENTS

| | | | |
|---|---|---|---|
| 4,653,316 | 3/1987 | Fukuhara | 73/146 |
| 4,796,998 | 1/1989 | Soma et al. | 73/146 |
| 4,896,964 | 1/1990 | Kitzaume | 73/146 |

FOREIGN PATENT DOCUMENTS 3447015 11/1985 Fed. Rep. of Germany.
3505455 8/1986 Fed. Rep. of Germany.

OTHER PUBLICATIONS

Elektronische Dämpfer Control-eine vollautomatisch adaptive DampKraftverstelluns für den BMU 635 CSi--ATX Automogiltechische Zeitschrift 89 (1987)9.
Abstract if Japanese Patent No. 59-17182 (A).

*Primary Examiner*—Donald O. Woodiel
*Attorney, Agent, or Firm*—Evenson, Wands, Edwards, Lenahan & McKeown

[57] ABSTRACT

A device for detecting the condition of the surface and adjacent edges of a road by means of electromagnetic radiation. A transmitter emits measuring beam pulses of electromagnetic radiation directed in a linear area of the road. Back scattered radiation from reflection of the measuring beam pulses by features of the road surface and adjacent areas are received and transformed into a time sequence signal. A signal processing and analysis unit analyzes the time sequence signal to identify features and surfaces of the road and their distance from the vehicle.

9 Claims, 3 Drawing Sheets

5,163,319

METHOD AND A DEVICE FOR RECOGNIZING THE CONDITION OF A ROAD

BACKGROUND AND SUMMARY OF THE INVENTION

The present invention relates to a method and a device for recognizing the condition of a road, particularly rough surface areas or unevenness of the edge of a road, by electromagnetic waves, such as light, according to the principle of measuring the transit time, in which a transmitter emits measuring beams and a receiver receives reflected measuring beams which generate signals to be analyzed at the time of reception.

Previously known apparatuses make it possible to obtain a CCD image of a specific road area by complex computing operations under favorable environmental conditions and with an expensive display system. However, this type of a display supplies no information on the distance, for example, of a displayed rough spot of the road surface.

On the other hand, distance measuring apparatuses according to the principle of measuring the transit time of signals which take a bearing on objects or scan them point by point have been known for some time. See, for example, German patent documents DE 32 19 423 A1, DE 34 47 015 A1.

It is an object of the invention to provide a method and a device for recognizing the condition of the road, particularly rough areas on the surface and at the edge of the road and their distance from a vehicle by electromagnetic radiation, using a transmitter to emit measuring beams and a receiver to transduce reflected measuring beams into signals to be fed to a processing and analysis unit. The apparatus needs to supply an image of the road surface condition in a simple manner and at the same time — particularly in the case of rough areas — provide information concerning the relative position/-distance of the rough areas.

SUMMARY OF THE INVENTION

This and other objects are provided by the present invention which provides a device for recognizing the condition of a road, particularly rough areas on the surface of the road and at the edge of the road, and their distance from a vehicle by electromagnetic radiation. The device includes a transmitter emitting measuring beams, and a receiver transducing reflected measuring beams into signals. A processing and analysis unit is coupled to the receiver and receives the signals as input. The transmitter and receiver are pulsed. The processing and analysis unit includes a read-only memory in which signatures of known road profiles are stored, and a processor module in which the signatures are correlated with the amplitudes/time course of the reflected measuring beams.

In another embodiment of the present invention, the device includes a transmitter emitting measuring beams, a receiver transducing reflected measuring beams into signals, and a processing and analysis unit coupled to the receiver. The transmitter and receiver respectively emit and receive electromagnetic radiation in a pulsed manner such that by means of the timing and sensing of the emitted measuring beams, different areas of the road surface and its edge are detected by the measuring beams.

An advantage of the present invention is that if only one transmitter and one receiver is used, as is done in an embodiment of the invention, the energy distribution of the transmitter over the whole distance to be scanned takes place in such a manner that backscattered energy from each distance range is approximately the same with the same backscatter coefficient.

According to another embodiment of the invention, several transmitters and receiving devices are focussed on the road in such a manner that a geometric assignment of the change of the signals and also of an edge of the road takes place by analyzing the differences of the backscatter signals.

In contrast to the known apparatuses in the present invention, a road profile is detected and simultaneously a geometric or distance-related assignment of this displayed profile takes place.

In an embodiment of the invention, a road profile — preferably after a plausibility check — is displayed at the dashboard of the vehicle, preferably on a vehicle computer.

However, the device according to the present invention may also be used for the connecting and disconnecting of driving components of the vehicle and/or for the vehicle suspension and damping. An electronic damper control makes it possible to adjust the chassis to the different road conditions which were detected. To do this, in a manner known per se, any parameter can be used for the chassis control which influences the level of the vehicle, such as the dynamic action of shock absorbers or the flow properties of a fluid, such as gas in pneumatic springs or of a fluid in hydraulic cylinders. Other conditions are also detected, particularly condition variables of the vehicle, and are taken into account by the processor to provide an adaptive control.

When the present invention is appropriately arranged at the vehicle in the forward area, the device is capable of detecting a slick road surface where the slickness is caused by water. It also can be used with good results in the driving direction for detecting profiles at a range of 1m to 50m.

The invention is not limited to a specific sensor arrangement. It can also detect ranges of less than one meter, for example, under a wheel axle, such as a front wheel axle of a motor vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
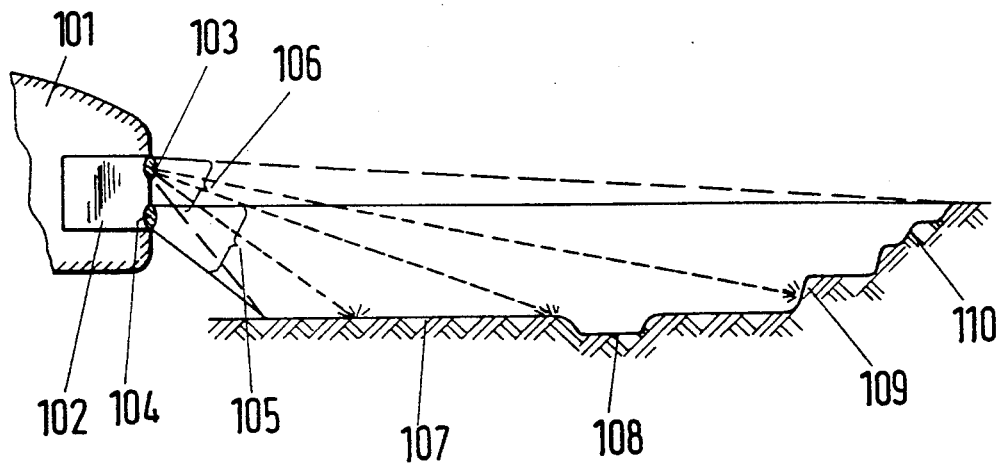
FIG. 1 is a view of a vehicle with the device for recognizing the condition of a road constructed in accordance with an embodiment of the present invention.
Figure 2:
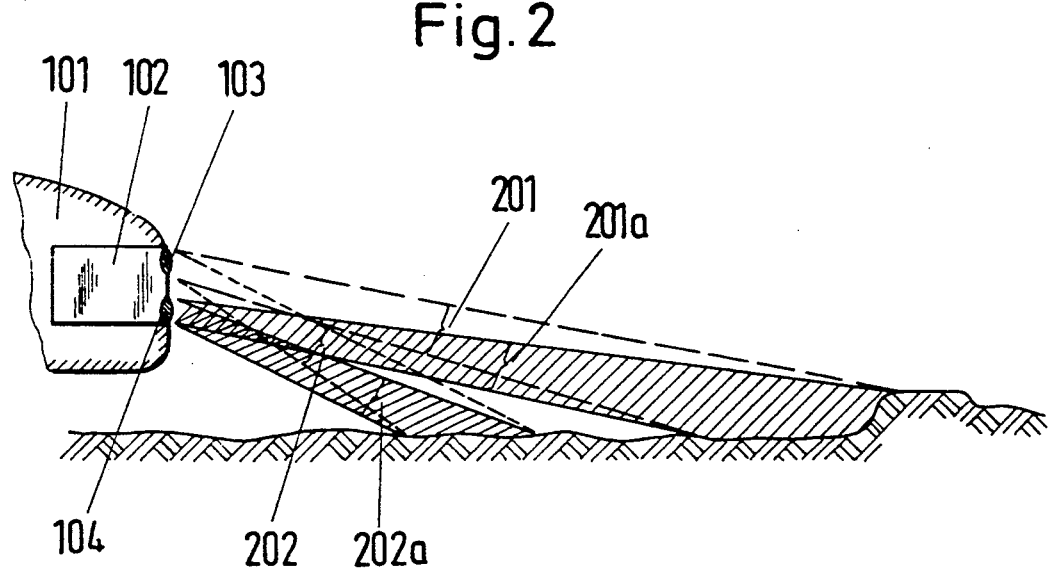
FIG. 2 is a view of the device with physically separate partial surfaces constructed in accordance with another embodiment of the present invention.

In FIGS. 1 and 2, a vehicle 101 is shown only by partial areas of its contour. In the forward area, approximately next to the front right headlight, a sensor 102 is installed for recognizing a road condition, including the edge of the road.

The installation point of the sensor 102 may be varied depending on the preferred purpose of usage or on the desired recognition range. The same applies to the angle of slope with respect to the road (angle of elevation) and the angle with respect to the driving direction or the longitudinal axis of the vehicle (azimuth).

In FIGS. 1 and 2, the transmitter 103 and the receiver 104 are housed in a common housing and are arranged above one another. However, they may also be arranged together, next to one another (FIG. 3), or separately (not shown).

As shown in FIG. 1, an area of backscatter 105 overlaps with that of electromagnetic radiation 106 emitted by the transmitter 103.

The backscatter output captured by the receiver 104 is amplified and generates signals, the shape (amplitude) and size/intervals of which are analyzed digitally and particularly incrementally in an analyzing circuit (logic or processor) in a conventional manner.

Figure 1A:
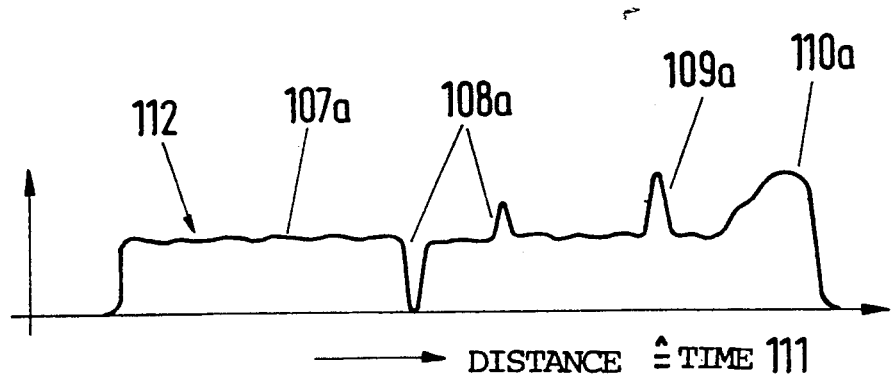
FIG. 1a represents a signal course corresponding to the road surface shown in FIG. 1.

FIG. 1a shows a typical signal course, plotted as distance over time 111. The signal course of FIG. 1a corresponds to the course of the road shown in FIG. 1. The road 107 has an essentially flat smooth area which corresponds to signal 107a which is almost as smooth. An indentation 108 in the road can be recognized by the pertaining peaks 108a and a curbstone 109 is peak 109a. Growth 110 at the edge of the road surface generates signals 110a with corresponding amplitudes.

For analysis, the receiving signal, before or after differentiation, may be divided into time intervals which, with respect to time, follow one another without any gaps. For the differentiation, two or more time-scanned receiving stores may be provided which have integrators and a differentiating circuit.

As shown in FIG. 2, two or more transmitting beams 201 and 202 may be formed which are spaced away from one another so that backscatter receiving ranges 201a and 202a are formed which are assigned to these transmitting beams. After the signal processing and the analysis of their respective transit times from the road to the receiver (according to the principle of measuring the transit time), received signals can easily be separated in one or several signal processing units and thus permit the geometric determination of the position of rough areas or the like.

Figure 2A:
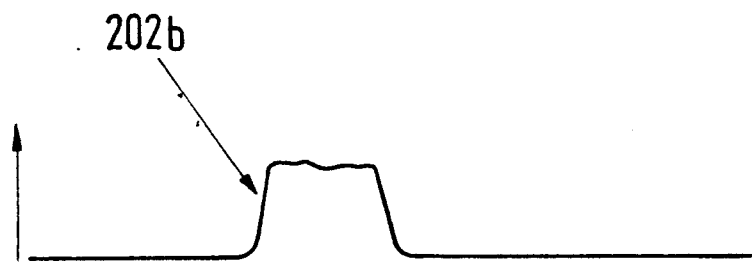
FIGS 2a and 2b represent the signal course corresponding to the road surface shown in FIG. 2.
Figure 2B:
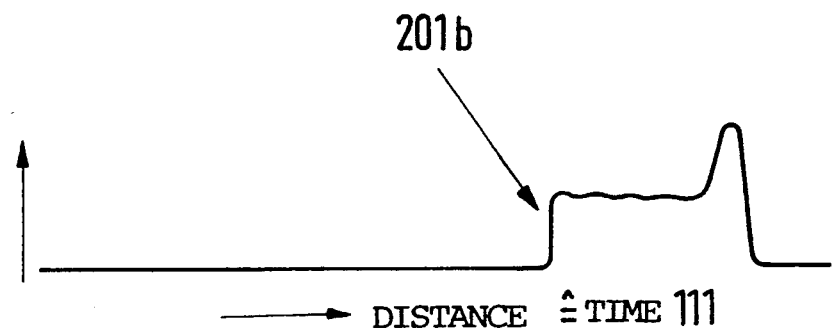

FIG. 2a shows the backscatter output 202b from the transmitting beam 202, and FIG. 2b, at reference number 201b, shows the backscatter output from the transmitting beam 201 as the corresponding signal course of FIG. 2.

When partial areas of the backscatter overlap, an adjustment may take place by means of the overlapping areas which facilitates the analysis and makes it more precise.

Figure 3:
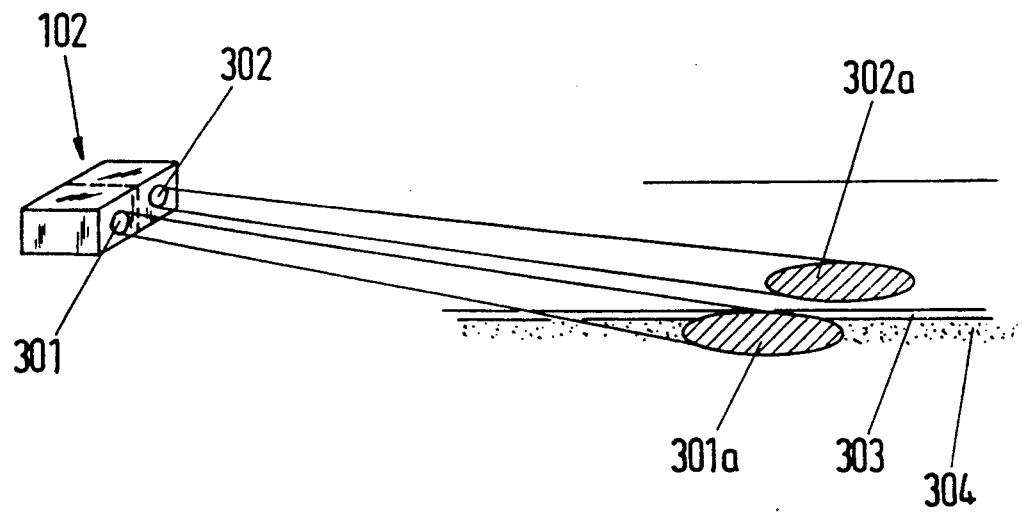
FIG. 3 is a view of a device constructed in accordance with an embodiment of the present invention for recognizing water puddles or similar slick road surface areas.

When the arrangement is to be used for the sensing of water-slick surfaces or similar slick surfaces or areas, a construction according to FIG. 3 is preferred. When the signal shapes, signal intervals, amplitudes, pulse width and/or the amplitude/time integral are analyzed, corresponding smooth signals (compare 107a in FIG. 1a) can easily be recognized and separated.

In the embodiment of FIG. 3, a transmitting and receiving apparatus 302 may also be aimed at the road at reference number 302a and another apparatus 301 may be aimed at the edge of the road at reference number 301a for obtaining corresponding signals of backscattered output (compare FIGS. 2a and 2b).

As in the embodiment of FIG. 2, according to FIG. 3, a geometric assignment — in this case, for example of a water puddle, of ice or the like — is permitted by means of the analysis of transit time differences of the backscatter signals. This is in contrast to the example of FIG. 1, in which the energy distribution takes place by way of the road surface in such a manner that the backscattered energy from any distance range is approximately the same with the same backscatter coefficient.

As shown with an embodiment of a processor controller used in the present invention depicted in FIG. 4, the processor-controlled operation takes place as follows:

From the periphery of, for example, a microprocessor, via an interface 401, selected data are supplied to the processor controller. These can be the steer angle (angle at the wheels), the brake control and the pressure change in the brake system, the acceleration, possibly the speed and others.

A short-time storage device 402 for measured-value deviations is connected to the interface 401 via a data-bus in order to permit an adaptation.

An analysis with a plausibility check of the detected road profile and of the distance of the characteristic surface features takes place in plausibility module 403. The display of these characteristic surface features takes place in display module 404.

Reference number 405 indicates a read-only memory for signatures, profiles and their deviations, such as curbstones, puddles, etc. These values are correlated by module 406 which is used as the signal processing and analysis unit, particularly for transit times and amplitudes or amplitude/item sequence. All of the modules are preferably part of an integrated circuit.

One receiver A and B for receiving the backscattered energy and one transmitter A and B for emitting light pulses are connected with module 406 in a manner known per se. In the present invention, laser light pulses as well as IR radiation may be used, IR (infrared radiation) being used when it is important to have low noise conditions.

Figure 4:
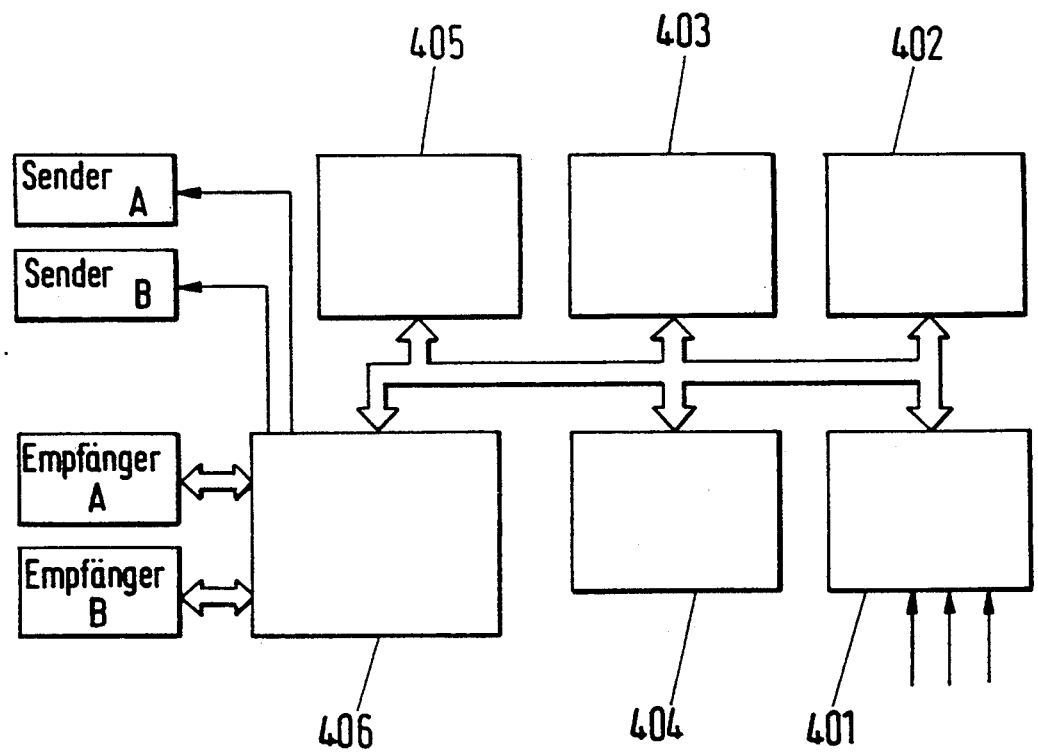
FIG. 4 is a block diagram of a processor that controls the functions of the device constructed in accordance with an embodiment of the present invention.

The processor according to FIG. 4 is designed to be adaptive with respect to determining acceptable useful signals. By means of its read-only memory 405, the processor carries out an adaptation to specific road conditions, such as the condition of a road surface or weather influences, like rain, ice and snow.

The processor may also be a coprocessor of a CPU or a similar computer-controlled device for the chassis control, particularly the level control of one or several wheels of a chassis. The control of the wheels can be accomplished by control the support or suspension of the wheels and/or the connecting or disconnecting of the driving component of the wheels.

An electric damper control system is described, for example, in ATZ 89 (1987) 9, Page 471 et seq. The connecting and disconnecting of driving elements is described in German Patent Document DE 35 05 455 A1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for detecting the condition of a road, including rough areas on the surface of the road and at the edge of the road and their distance from a vehicle by electromagnetic radiation, comprising:

transmitter means for emitting measuring beam pulses of electromagnetic radiation directed to a linear area of said road;

receiver means for detecting backscattered radiation from reflection of said measuring beam pulses by features and surfaces within said area of the road, and for transforming detected backscattered radiation from each pulse into a time sequence signal;

a signal processing and analysis unit coupled to receive said time sequence signal, said signal processing an analysis unit including means for analyzing said time sequence signal to identify features and surfaces of said road and their distance from said vehicle.

2. A device according to claim 1, wherein said signal processing and analysis unit includes a read only memory in which signatures of known road profiles are stored, and means for correlating detected time sequence signals with said signatures.

3. A device according to claim 2, wherein the processing and analysis unit further includes a vehicle interface means for receiving measuring values, and a short-time storage means coupled to the vehicle interface means adapting the measuring values during driving operation.

4. A device according to claim 2, wherein the processing and analysis unit further includes a plausibility module coupled to the processor module, said plausibility module checking the plausibility of a detected profile at the road surface or at the edge of the road, and a display module installable in a vehicle dashboard for providing a profile display.

5. A device according to claim 2, wherein the processing and analysis unit includes means for analyzing the signals such that areas which, with respect to time, follow one another without any gaps, are detected and displayed successively at the range of a distance to the vehicle of approximately 1m to approximately 50m.

6. A device according to claim 2, wherein the transmitter emits electromagnetic radiation in pulses at predetermined azimuth angle ranges and at predetermined elevation angle ranges.

7. A device according to claim 2, wherein the transmitter emits its electromagnetic radiation pulses in time ranges which overlap, the device including means for adjusting a display of the distance as a result of the overlapping.

8. A device according to claim 2, further comprising multiple transmitters and receivers.

9. A method for detecting the condition of a road, including rough areas on the surface of the road and at the edge of the road, and their distance from a vehicle, by electromagnetic radiation, comprising the steps of:

emitting measuring beam pulses of electromagnetic radiation directed to a linear area of said road;

detecting backscattered radiation from reflection of said measuring beam pulses by features and surfaces within said area of the road;

transforming detected backscattered radiation from each pulse into a time sequence signal;

analyzing said time sequence signal to identify features and surfaces of said road, and their distance from said vehicle.

* * * * *